W. B. PRICE.
BRAKE.
APPLICATION FILED DEC. 2, 1913.

1,116,115.

Patented Nov. 3, 1914.

2 SHEETS—SHEET 1.

Witnesses
W. R. Smith
F. O. Parker

Inventor
W. B. Price,
By Victor J. Evans
Attorney

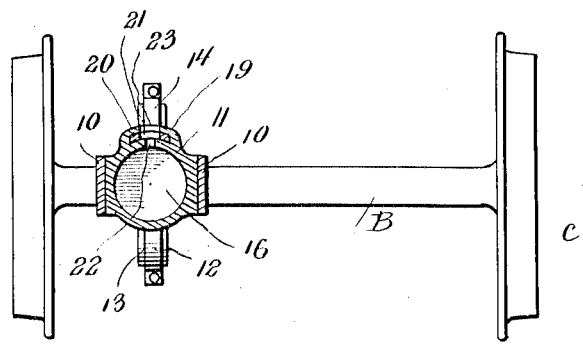
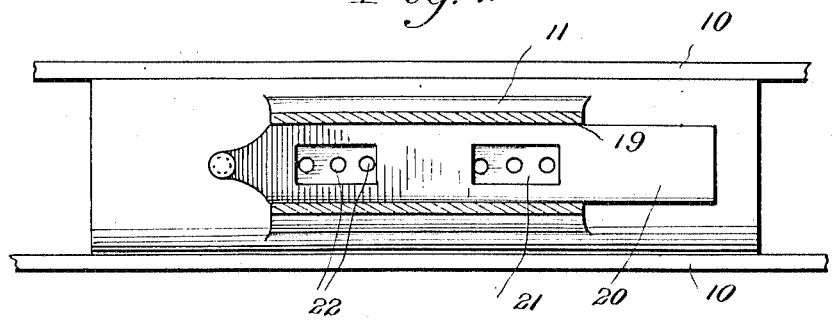
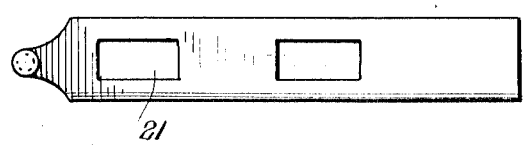

UNITED STATES PATENT OFFICE.

WALTER B. PRICE, OF NEW ORLEANS, LOUISIANA.

BRAKE.

1,116,115. Specification of Letters Patent. Patented Nov. 3, 1914.

Application filed December 2, 1913. Serial No. 804,259.

*To all whom it may concern:*

Be it known that I, WALTER B. PRICE, a citizen of the United States, residing at New Orleans, in the parish of Orleans and State of Louisiana, have invented new and useful Improvements in Brakes, of which the following is a specification.

The invention relates to vehicle brakes, and more particularly to the class of fluid pressure brakes for cars, automobiles, wagons, or the like.

The primary object of the invention is the provision of a brake wherein the vehicle or the like can be brought to a standstill, the brake being of a novel construction and is fluid controlled.

Another object of the invention is the provision of a brake wherein the same is under the control of the operator of the vehicle and obviates the use of brake shoes for the stopping of the said vehicle.

A further object of the invention is the provision of a brake of this character which is extremely simple in construction, reliable and efficient in operation, and inexpensive to manufacture.

With these and other objects in view, the invention consists in the construction, combination and arrangement of parts as will be hereinafter fully described, illustrated in the accompanying drawings, and pointed out in the claim hereunto appended.

Figure 1:
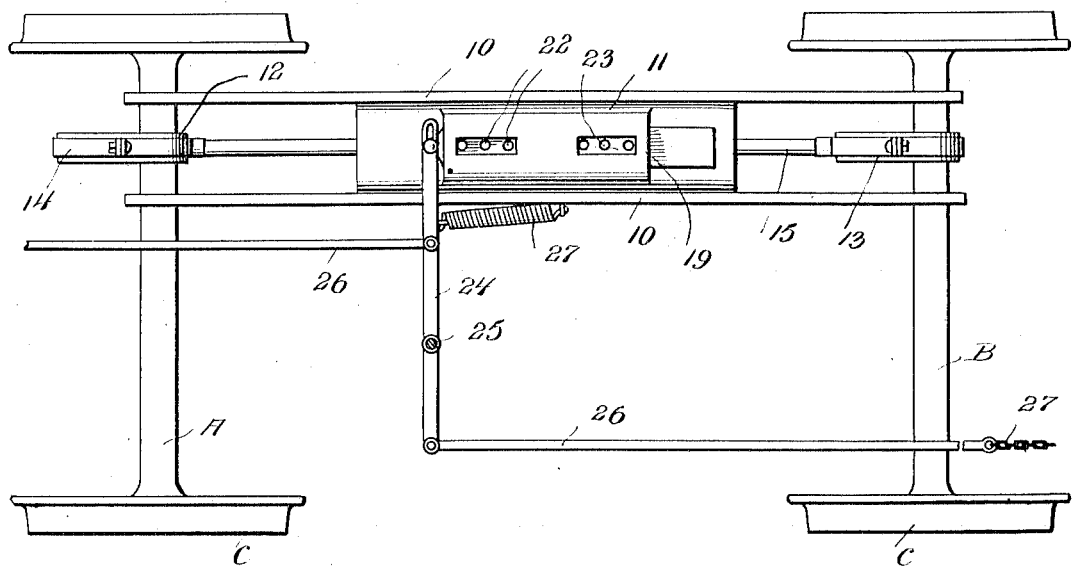
Figure 2:
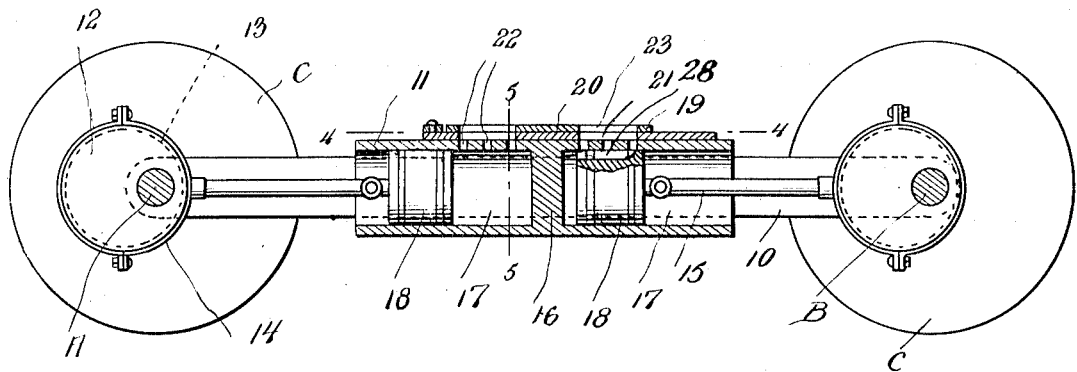

In the drawings:—Figure 1 is a top plan view of a brake constructed in accordance with the invention, the same being shown applied to a pair of axles of a vehicle. Fig. 2 is a vertical longitudinal sectional view through the air cylinder of the brake mechanism. Fig. 3 is a plan view of the slide valve for controlling the admission of air to and the exhaust of the same from the cylinder. Fig. 4 is a horizontal sectional view on the line 4—4 of Fig. 2. Fig. 5 is a sectional view on the line 5—5 of Fig. 2.

Similar reference characters indicate corresponding parts throughout the several views in the drawings.

Referring to the drawings in detail, A and B represent axles, respectively, and C the wheels thereon. Loosely connected on the axles A and B and extending longitudinally of the vehicle, and adapted to be supported by the axles, are spaced parallel supporting bars 10, between which is arranged an air cylinder 11 fixed to the bars in any suitable manner at a point intermediate the axles A and B, while secured to the said axles A and B between the bars 10 are eccentrics or cams 12, each being formed with a peripheral groove 13 for receiving eccentric or cam straps 14, the same surrounding the eccentric or cam 12, and one section of the strap being formed with an extension rod 15 which serves as a piston rod or stem.

The cylinder is provided with a medial partition 16 forming duplex air chambers 17 therein, and working within these chambers 17 are piston heads 18 to which are pivotally connected the piston rods 15 so that on rotation of the axles A and B the piston heads 18 will slide back and forth in the chambers 17 in the cylinder 11, the air being admitted to and exhausted from the chambers 17 in the cylinder in a manner presently described.

While the cylinder is shown as provided with duplex air chambers, it is to be understood that the cylinder can be constructed to provide a single air chamber, and working within this chamber one piston head to be connected with the piston rod to be used on rotation of one axle of such vehicles having but one revolving axle, as automobiles, wagons, etc.

Formed on the cylinder 11 at the top thereof is a crown or hood 19 forming a guideway for a slide valve 20 which is formed with openings 21 adapted to be moved into registration with apertures 23 in the hood 19 and ports 22 formed in the cylinder 11 contiguous to and on opposite sides of the partition 16 therein so that when the openings 21 are in register with the openings 22 in the cylinder air may pass freely to and from the chamber 17 upon movement of the piston heads 18. When the slide valve 20 is shifted it closes the openings 22, thereby preventing the exhaust of air within the chambers 17, thus holding the piston heads 18 under compression so that the axles will be prevented from turning, thereby bringing the vehicle to a standstill, the slide valve 20 being operated in a manner presently described.

Pivotally connected to one end of the slide valve 20 is a rocking lever 24 which turns upon a pivot 25 fixed to the vehicle truck, and to this lever on opposite sides of the pivot 25 are pivotally connected oppositely extending throw rods 26 which are connected to any suitable winding or unwinding mechanism through the medium of chains 27 so that on the shifting of either rod 26 the lever 24 will be rocked for moving the brake rod 20 for closing the openings 22 in the cylinder 11, or opening the same, it being understood of course that when the openings 22 are closed the air within the chambers 17 will be prevented from exhausting therefrom, thus preventing the turning of the axles A and B and thereby holding the vehicle at a standstill.

Connected to the rocking lever 24 is a coiled retractile spring 27, which is also connected to one of the supporting bars 10, the spring being designed to shift the slide valve 20 to normal position, whereby the openings 21 therein will register with the openings 22 in the cylinder 11 on the slackening of the chains 27 so that the travel of the vehicle will not be interfered with as the air within the cylinders 17 will be exhausted on the approaching of the pistons and on the separation of the pistons a new charge of air will be sucked into the cylinders.

The piston heads 18 are formed with depressions 28 in alinement with the openings 22 so that air will freely flow within the cylinders or exhaust therefrom during the working of the piston heads therein.

From the foregoing it is thought that the construction and manner of operation of the device will be clearly understood, and therefore a more extended explanation has been omitted.

What is claimed is:—

The combination with a car truck, of a piston cylinder arranged between the axles thereof and having a medial partition forming duplex chambers therein opening through opposite ends of the cylinder, pistons reciprocatingly movable within the chambers in the cylinder, eccentrics mounted on the axles, eccentric straps embracing the said eccentrics and having arms pivotally connected with the respective pistons, the said cylinder being formed with openings contiguous to the partition therein at the uppermost side of the cylinder, a raised portion formed without the cylinder to provide a guide hood longitudinally thereof and having slots in alinement with the openings in the cylinder, and a slide movable within the guide hood and having slots adapted for registration with the slots in the hood on the shifting of the said slide to one position.

In testimony whereof I affix my signature in presence of two witnesses.

WALTER B. PRICE.

Witnesses:
AARON L. POWELL,
PATRICK PUDNER.